United States Patent [19]

Barrett et al.

[11] 4,070,609

[45] Jan. 24, 1978

[54] AUTOMATIC CONTROL SYSTEM

[75] Inventors: William J. Barrett; Elwood J. Meyers, both of Rockford, Ill.

[73] Assignee: Barber-Colman Company, Rockford, Ill.

[21] Appl. No.: 538,133

[22] Filed: Jan. 2, 1975

[51] Int. Cl.² ............................................ G05B 11/42
[52] U.S. Cl. ..................................... 318/609; 318/610
[58] Field of Search ................................ 318/609, 610

[56] References Cited
U.S. PATENT DOCUMENTS

| 3,301,269 | 1/1967 | Marwood | 318/696 UX |
| 3,391,315 | 7/1968 | Schwartzenberg | 318/609 X |
| 3,391,316 | 7/1968 | Ross | 318/609 X |
| 3,533,236 | 10/1970 | Cottington | 318/609 X |
| 3,696,282 | 10/1973 | Hirokawa | 318/610 X |
| 3,699,989 | 10/1972 | O'Connor et al. | 318/609 X |
| 3,741,474 | 6/1973 | Kawada | 318/610 UX |
| 3,833,860 | 9/1974 | Snyder | 318/609 X |
| 3,864,554 | 2/1975 | Chevalier | 318/609 X |

Primary Examiner—B. Dobeck

[57] ABSTRACT

An automatic control system wherein repetitive pulses, the frequency of which is responsive to a remote condition such as prime mover RPM, are converted to a D.C. voltage level which is then compared to a reference to produce an error signal. Three further signals are then produced, one proportional to the error signal, one proportional to its integral and the other proportional to its derivative. The three further signals are summed and amplified to the extent necessary and the resultant used to control an element which in turn controls the remote condition. Included is a fail safe circuit effective to cause the remote condition controlling element to shut off in the event incoming pulses are not present. Provision is made whereby the system may respond to the summed signals described above or an external signal which may be derived from a function generator or a limiting value established by an external condition. A particular application described for the system is its use as a governor system for prime movers such as internal combustion engines and steam turbines.

10 Claims, 3 Drawing Figures

AUTOMATIC CONTROL SYSTEM

BACKGROUND OF THE INVENTION

This application relates generally to automatic control systems. More specifically it relates to electronic automatic control systems wherein the control signals utilized are combined functions of a proportional signal and the integral and derivative thereof.

Automatic control systems are, of course, well known in the art. Such systems using electrical signals representative of the condition of an element to be controlled and comparing that signal with a reference signal to produce an error signal have been used for a variety of purposes. A particular application of such devices has been their use as governors controlling the speed (RPM) of internal combustion engines.

Generally speaking, it is desired to control engine RPM in either an isochronous or droop mode, that is, either to maintain constant speed in spite of variations of engine load or to permit a reduction in speed as the load increases. In either case it is desirable to provide a system wherein the transient response, that is, the response time of the engine with its control to a change in condition is at a minimum, and in so doing to minimize overspeed and hunting.

In addition there are a number of situations wherein it is desired to parallel engines to a common load; for instance, in marine applications wherein a propeller may be driven by more than one engine coupled to the propeller through a gear box.

Beyond this it is very frequently desired to exercise limiting controls over an engine during start up periods. For instance, it may be considered important to limit the speed of an engine until a desired operating temperature has been reached or to control the flow of fuel until a desired manifold pressure or speed has been achieved. Other parameters may be considered important in order to prolong the life of the engine or to avoid damage thereto.

Therefore, it is an object of this invention to provide a novel automatic control system which is sensitive to variations in the condition of a controlled element so as to accurately maintain a desired condition.

It is a further object of this invention to provide a novel control system capable of operating in more than one control mode.

Another object of this invention is to provide a novel control system which is fail safe, that is it is effective to shut down a controlled element in the event a harmful condition exists.

Still another object of this invention is to provide a novel control system effective to exercise control in response to internal or external references or in further response to external signals representing limits or control programs.

A still further object of this invention is to provide a novel control system which permits a controlled element such as an internal combustion engine controlled thereby to operate in parallel with other controlled elements such as other internal combustion engines.

A further object of this invention is to provide a novel control system which is particularly effective for controlling the speed of internal combustion engines in such a way as to conserve fuel, accurately maintain a desired speed, prevent the engine from running away, permit one engine to be paralleled with another and to recognize limits imposed by various parameters such as temperature, manifold pressure or oil pressure, or in response to speed control programs.

BRIEF SUMMARY OF THE INVENTION

The foregoing and other objects are achieved in one embodiment of the invention by the provision of a control circuit deriving signals directly proportional to a speed control signal and also proportional to the integral and derivative of that signal and summing them to produce a control signal. This embodiment of the invention also includes means permitting the system to operate in more than one mode, and to respond to either the control signal or externally generated signals.

BRIEF DESCRIPTION OF THE DRAWINGS

The invention itself is set forth in the claims appended hereto and forming a part of this application. While an understanding of an embodiment thereof may be had by reference to the detailed description taken in conjunction with the drawings in which:

DETAILED DESCRIPTION

Figure 1:
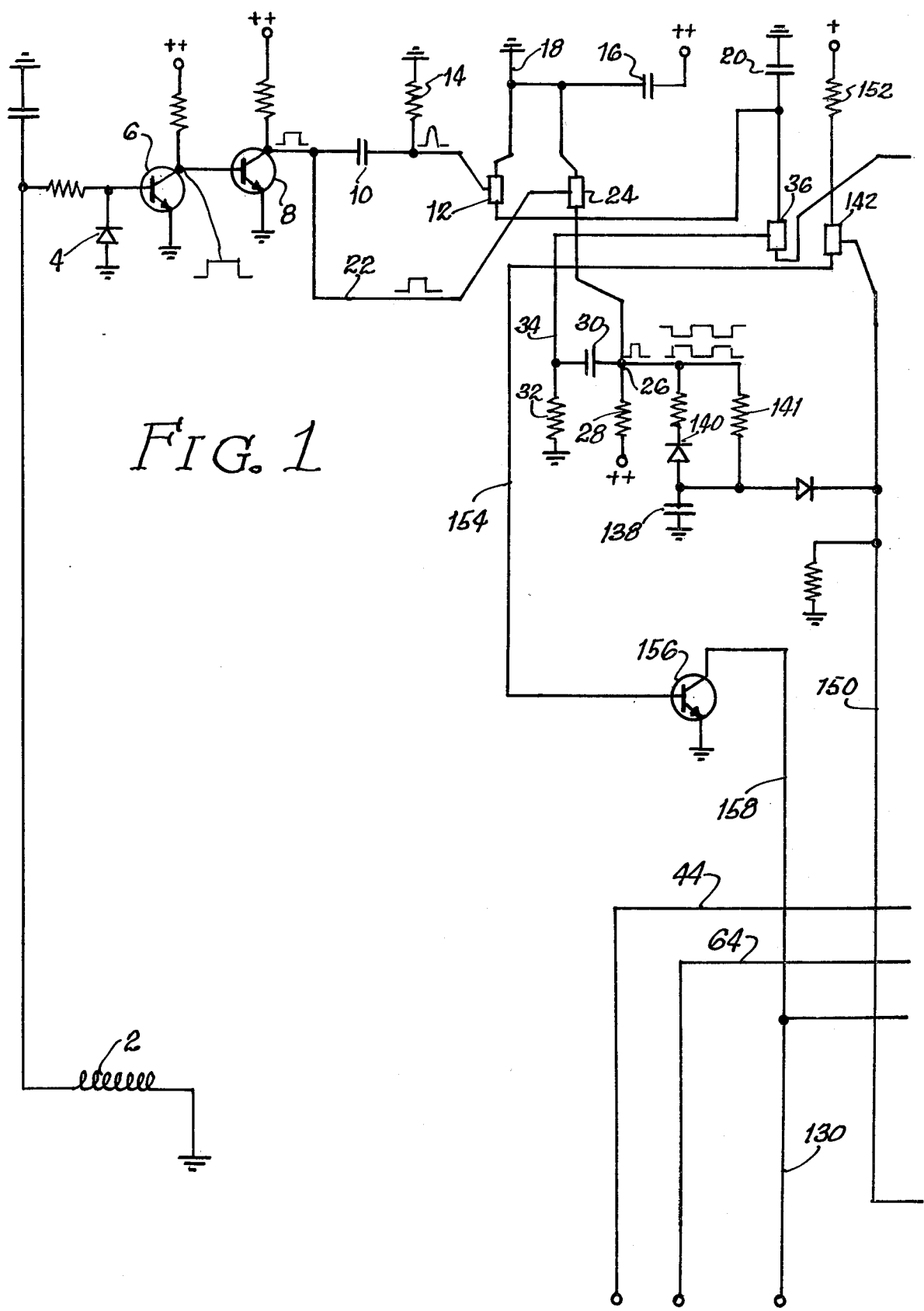
FIGS. 1, 2 and 3 taken together illustrate a circuit diagram of an embodiment of the invention.
Figure 2:
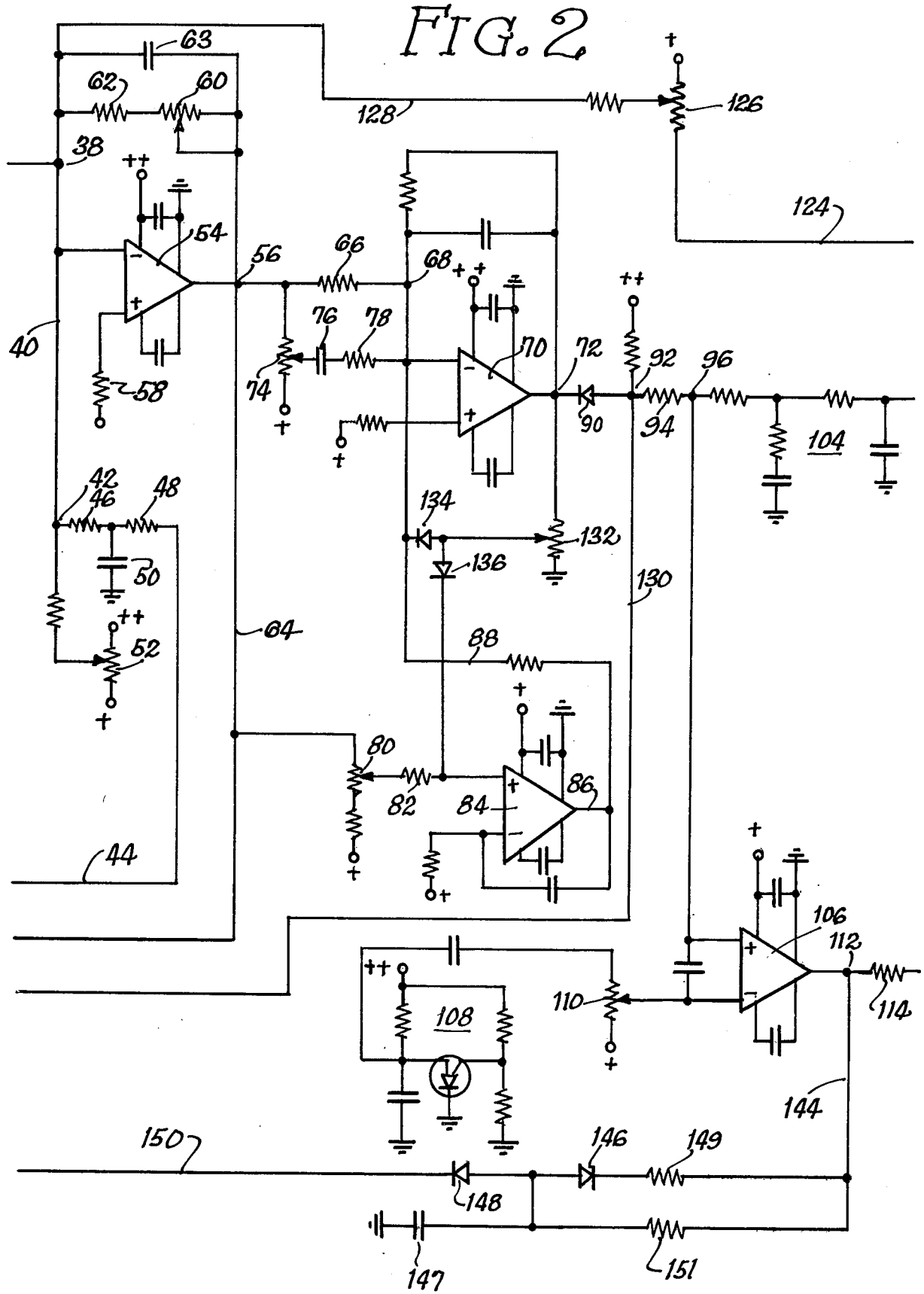

A preferred embodiment of the invention is constituted by a means for receiving a signal proportional to a sensed condition, which signal as illustrated is constituted by a repetitive signal having a generally sinusoidal configuration produced by a magnetic pickup 2 positioned in any convenient and desirable location on the device to be controlled. In the case of an internal combustion engine, a convenient location is adjacent a flywheel so that a pulse is produced each time a gear tooth on the flywheel rotates past the pickup. The signal from the pickup is supplied to a clipper and amplifier constituted by a diode 4 and a pair of transistors 6 and 8. The diode 4 is poled to clip the negative portion of the input signal while the positive going portion is supplied to the base of the transistor 6.

The collector of the transistor 6, as may be seen, is connected to the base of the transistor 8 so that when the transistor 6 conducts in response to an input signal the transistor 8 turns off causing its collector to go high. The transistors 6 and 8 and their operating parameters are chosen so as to produce a square wave output at the collector of the transistor 8 in response to each input signal wherein its maximum value is held to a desired level.

A first circuit from the collector of the transistor 8 is constituted by a capacitor 10 coupling that collector to the gate of a semiconductor switch means 12. Shunting the capacitor 10 to ground is a resistor 14 whereby the square wave output of the collector of transistor 8 is differentiated and when present causes the semiconductor switch means 12 to conduct. One side of the switch means 12 is connected to a potential source through a filter capacitor 16 and a ground connection 18. The other side of the switch means 12 is connected to one side of a second capacitor 20, the other side of which is grounded. Thus each time the switch means 12 is closed or conducts, the charge on the capacitor 20 is removed to the ground connection 18.

Another connection from the collector of transistor 8 is via a conductor 22 to the control element of a second semiconductor switch means 24 which has one side connected to the source of positive potential via the capacitor 16 and its other side connected to the junction 26 of a resistor 28 and a capacitor 30. The resistor 28 in turn is connected to the source of positive potential. When the switch means 24 is nonconductive the junction 26 is high, but when that switch means is closed or conducts in response to the conduction of transistor 8 the junction 26 goes low so that the switch means 24 functions as an inverter with respect to the square wave input signal on conductor 22.

The square wave at junction 26 is differentiated by the combination of a capacitor 30 and a grounded resistor 32 so that an essentially spiked signal is supplied via a conductor 34 to the gate of a third semiconductor switch means 36. The switch means 36 is connected between the capacitor 20 and a summing junction 38 so that when it conducts one terminal of the capacitor 20 is connected to that junction.

The circuit just described is therefore one in which the switch means 12 conducts substantially in phase with the output square wave of the transistor 8 to remove charge from the capacitor 20 in amounts proportional to the frequency of the input signal. Because of the inverter action of the switch means 24 the switch means 36 conducts substantially 180° out of phase with the input signal, and a pulsating D.C. current appears at the summing junction, the average value of which is proportional to the frequency of the input signal. The summing junction itself is at a fixed voltage established by a potential source and a resistor 58. It is evident then that capacitor 20 is alternately charged by current flow from the summing junction 38 through the switch means 36 and discharged to ground through switch means 12. Since the charge stored in a capacitor is defined by $Q = CE$, where Q is the charge, C the capacitance and E the impressed voltage, it can be seen that each cycle of charge and discharge transfers a fixed amount of charge. This causes a pulsating D.C. current to flow from the summing junction, the average value of which is proportional to the input frequency.

A principal advantage of the circuit just described is that it serves to eliminate the effect of transient signals, i.e. noise by deriving the D.C. voltage at junction 38 from a regulated source isolated from the input signal itself.

In order to provide an error signal the D.C. feedback signal at junction 38 is compared to a reference signal. The reference is provided on a conductor 40 which is connected to junction 38 and a junction 42. One input to the junction 42 may be a reference derived from an external source via a conductor 44 and supplied through a filter consisting of resistors 46 and 48 and a capacitor 50. Another input to the junction 42 may be derived from a potentiometer 52 and is designated as the internal reference. Thus the combined signal at the junction 42 is the internal reference plus or minus the external reference. In the particular application described, namely, that of a governor for internal combustion engines, the feedback and reference signals may be signals representing the actual speed of an engine and the desired speed, respectively.

In any case the signals summed at the junction 38 are the feedback and reference signals which are supplied as one input to an operational amplifier 54. The output of the amplifier 54 is supplied to a junction 56. A second input to the amplifier 54 is constituted by a fixed voltage reference derived via a resistor 58. Thus any difference between the two inputs to the amplifier appear as an output at the junction 56, and is fed back to the amplifier input from the junction 38 through gain control adjustable resistor circuit 60 and 62. The capacitor 63 functions to smooth out the pulsating signals derived from the capacitor 20.

The circuit thus far described is one which produces an error signal which is proportional to the magnitude of the error that is the difference between the feedback and reference signals at the junction 56.

The proportional error signal thus derived is supplied via a conductor 64 to a jack or external point on the control and be displayed by any suitable means for monitoring purposes if desired. The same signal is also supplied through a resistor 66 to a junction 68.

At the junction 56 the error signal is processed in three separate parallel paths to produce a first signal proportioned to the error, a second signal proportional to the integral of the error and a third signal proportional to the derivative of the error. The proportioned signal regulates or determines the gain or amount of correction while the integral signal regulates the correction rate, and the derivative signal determines the amount of control action as a function of rate of change in the error signal. Thus, the derivative signal, if there is a high rate of change in error signal as might occur when there is a high transient, will provide a high control signal in order to achieve a more rapid correction.

In order to derive the proportional control signal the signal at the junction 68 is supplied as a first input to an amplifier 70, the output of which is a junction 72. The signal proportioned to the derivative of the error signal is provided by taking the error signal from the slider of a potentiometer 74 and coupling it through a capacitor 76 and resistor 78 as a second input to the amplifier 70. The charge current on capacitor 76 is of course proportional to the derivative of the voltage on the potentiometer 74.

In order to produce the integral of the error signal that signal is taken from the slide of a gain control potentiometer 80 connected to the junction 56 via the conductor 64 and supplied through resistor 82 as one input to an amplifier 84. The amplifier 84 connected as a non-inverting integrating amplifier has its output 86 connected by a conductor 88 to constitute a third input to the amplifier 70.

The output of the amplifier 70, therefore, is a control signal which is a function of a first signal proportional to the error signal, a second signal proportional to the integral error signal and a third signal proportional to the derivative of the error signal. The control signal is supplied via a diode 90 to a junction 92 to which is connected a resistor 94. The other end of the resistor 94 is connected to a further junction 96.

Figure 3:
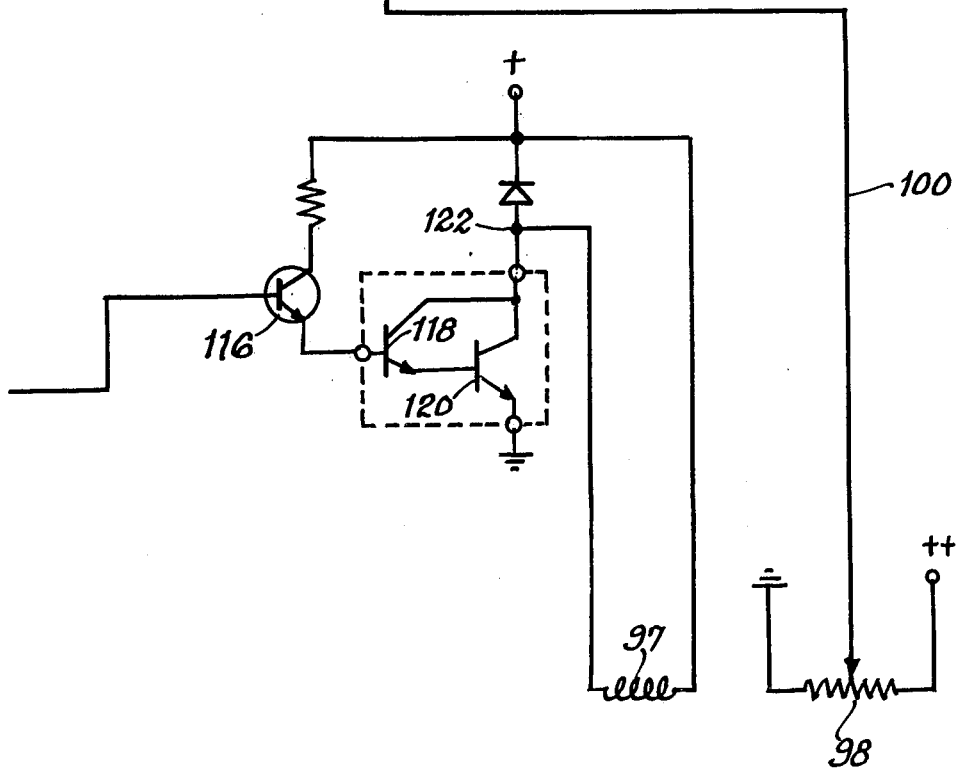

A control element, the state of which is desired to be controlled by the control signal, may be constituted by any number of devices. In the case of an engine governor the controlled element may be a valve controlling the flow of fuel to the engine, the position of which is determined by the energization state of a solenoid coil such as is shown at 97 in FIG. 3. The energization state is, of course, a function of the average current in the coil. In order to provide a signal representative of the actual position of a valve or other control element, a potentiometer 98 may be mechanically connected to the solenoid actuator so as to produce a feedback signal on its slider which represents that actual position. That signal is supplied by means of conductors 100 and 102 through a filter network 104 to the junction 96 where its magnitude is compared with the magnitude of the control signal at the junction 92. The voltage at junction 96 is the weighted average of the control signal and the feedback signal. This signal is supplied as one input of an amplifier 106. A programmed unijunction transistor oscillator 108 supplies a fixed frequency signal to a gain control potentiometer 110, the output of which is connected to the other input of the amplifier 106. The output of the oscillator 108 is a sawtooth wave and the effect of the amplifier 106 and the difference signal applied from the junction 96 is to produce a pulse width modulated signal at the output 112 of the amplifier which determines the average current flowing in the coil 97. The junction 112 is connected by a resistor 114 to the base of a transistor 116, the emitter of which is connected to the base of one transistor of a pair of transistors 118 and 120 connected in a Darlington circuit. So as to provide a snap action switching operation one side of the coil 97 is connected at 122 to the output of the Darlington circuit while the other side of that coil is connected to the source of direct current voltage. Thus when the controlled element is at a position other than that desired, the difference between the feedback voltage and the control signal at the junction 96 is effective to cause a greater or lesser amount of current to flow in the coil 97 to thereby move the controlled element toward its desired position.

If it is desired to have an engine controlled by a circuit according to the invention operate in the droop mode, the feedback signal from the potentiometer 98 may be supplied via a conductor 124 through a gain control potentiometer 126 and its slider connected to a conductor 128 so as to provide a further input to the amplifier 54. The effect of this connection is to provide an offset to the sum of the feedback and reference signals at the junction 38 and to therefore reduce the error signal at the junction 56.

As pointed out previously, it may be desired to provide a control signal for the controlled element from an external source. This can be done by means of a least detector circuit constituted in part by a conductor 130 connected to the junction 92 and to a terminal for connection to an external signal source. This circuit is completed by the diode 90 which, as will be noted, is poled with its cathode connected to the summing point 72. As illustrated, the control signal is normally a negative signal with respect to the potential at 96 and when no other signal is present at the junction 92 the diode 90 conducts. However, if an external control signal via the conductor 130, and that signal too is negative but less negative than the control signal, the diode 90 will not conduct and the external signal will be effective together with the feedback signal from the potentiometer 98 to determine the conduction of the amplifier 106. Obviously more than one external terminal could be provided so as to permit the possibility of obtaining external control signals from more than one source as described previously.

A further feature is the provision of a limit circuit to prevent the production of a control signal which could conceivably be of a magnitude effective to force the controlled element beyond some mechanical limit of movement which may be imposed thereon. This is provided by means of a potentiometer 132, the slider of which is connected through a diode 134 to the input of the amplifier 70 and through a diode 136 connected to the input of amplifier 84. If the control signal should become excessively large the diodes 134 and 136 will conduct so as to limit the proportional and integral paths and thereby the control signal itself. As an alternative the connection through diode 134 may be eliminated to limit the integral path only and prevent integral windup.

In a number of situations, certainly when the circuit of the invention is used as a governor for prime movers such as internal combustion engines, it is undesirable to continue to supply fuel to an engine which has failed to start or is perhaps stalled as damage may be done to the engine thereby. To eliminate the possibility of such an event a fail safe circuit is provided. A first element in this circuit is a capacitor 138 (see FIG. 1) which is connected to be discharged through a diode 140 each time the transistor 24 conducts, that is each time an input pulse is generated by the coil 2 indicating that the engine is running. In the event that the engine is not running, the capacitor 138 charges to the value sufficient to turn on a field effect transistor 142. The charging circuit for the capacitor 138 is through a resistor 141 connected to the positive source through resistor 28. The transistor 142 has its source connected through a resistor 152 to a source of positive potential while its drain is connected via a conductor 154 to the base of a transistor 156. The transistor 156 has its collector connected by a conductor 158 to the conductor 130 which in turn is connected to the junction 92. Thus when transistor 142 conducts the transistor 156 conducts in turn and the junction 92 is thereupon connected directly to common or ground so as to prevent any further supply of control signals to the loop, including the coil 97, feedback potentiometer 98 and amplifier 106. When this occurs of course the actuating coil 97 is no longer energized to any degree and any actuator controlled thereby can be returned to a shut off position by any suitable means, such as a return spring.

A second function of the switch means 142 is to operate as a part of the output current limit circuit. Capacitor 147 is charged through resistor 151 and discharges through that resistor, diode 146 and resistor 149. Therefore, the voltage on capacitor 147 is determined by the duty cycle of the output at junction 112. When capacitor 147 is charged sufficiently diode 148 causes the switch means 142 to conduct. When switch means 142 conducts the transistor 156 conducts as described previously so that the output duty cycle is effectively regulated.

In summary, the control circuit provided is one which offers the following advantages amongst others. It is fail safe, that is the output control signal goes to zero in the event that there is a failure in the apparatus being controlled. The error signal is one which is proportional to a difference between a reference and a feedback signal, and is also proportional to the integral and derivative of that signal and is therefore fast acting and stable. Further, it may be operated either in an isochronous or a droop mode. In addition it has the capability of supplying a control signal from an internal reference or external sources if desired.

Obviously changes and modifications may be made in the embodiment disclosed without departing from the inventive concept as set forth in the claims, and it is intended by those claims to cover all such changes and modifications as come within their scope.

What is claimed as new and desired to be secured by Letters Patent is:

1. In an automatic control circuit, including means for producing a signal representative of a remote condition, the improvement comprising: first means receiving a signal representative of a remote condition for deriving a direct current input signal, the average value of which is representative of the remote condition; second means for comparing said input signal with a reference signal to derive an error signal; third means for deriving a control signal which is proportional to said error signal and to the integral and derivative thereof; fourth means for deriving a feedback signal representative of the position of a controlling element; fifth means for comparing said control signal and said feedback signal; sixth means responsive to said comparing means to produce an actuating signal to cause a controlled element to assume a desired position; and seventh means for coupling the feedback signal to an input of said second means.

2. An automatic control circuit as set forth in claim 1, including means for limiting said control signal.

3. In an automatic control circuit, including means for producing a signal representative of a remote condition, the improvement comprising: first means receiving a signal representative of a remote condition for deriving a direct current input signal, the average value of which is representative of the remote condition; second means for comparing said input signal with a reference signal to derive an error signal; third means for deriving a control signal which is proportional to said error signal and to the integral and derivative thereof; fourth means for deriving a feedback signal representative of a position of a controlling element; fifth means for comparing said control signal and said error signal; sixth means responsive to said comparing means to produce an actuating signal to cause a controlled element to assume a desired position; and means responsive to the absence of an input signal to reduce said control signal to zero.

4. In an automatic control circuit, including means for producing a signal representative of a remote condition, the improvement comprising: means for receiving an alternating current signal representative of the remote condition; means for converting the alternating current signal into a unipolar signal; first means for deriving a direct current input signal from the unipolar signal wherein the average value of the direct current signal is representative of the remote condition comprising a capacitor, first switching means connecting said capacitor to ground, second switching means connected to said capacitor to control the charging thereof, means connecting said first switching means to said means coupling said unipolar signal to control the operation thereof, and means also connected to said second switching means for coupling the unipolar signal thereto for controlling the operation of said second switching means; second means for comparing said input signal with a reference signal to derive an error signal; third means for deriving a control signal which is proportional to said error signal and to the integral and derivative thereof; fourth means for deriving a feedback signal representative of the position of a controlling element; fifth means for comparing said control signal and said feedback signal; and sixth means responsive to said comparing means to produce an actuating signal to cause a controlled element to assume a desired position.

5. In an automatic control circuit, including means for producing a signal representative of a remote condition, the improvement conprising: first means receiving a signal representative of a remote condition for deriving a direct current input signal, the average value of which is representative of the remote condition; second means for comparing said input signal with a reference signal to derive an error signal; third means for deriving a control signal which is proportional to said error signal and to the integral and derivative thereof; fourth means for deriving a feedback signal representative of the position of a controlling element; fifth means for comparing said control signal and said feedback signal; sixth means responsive to said comparing means to produce an actuating signal to cause a controlled element to assume a desired position; and means connected to said third means for supplying another control signal and means for selecting which control signal shall be compared with said feedback signal.

6. An automatic control circuit as set forth in claim 5 wherein said sixth means is constituted by a pulse width modulation circuit and means for connecting the output of said pulse width modulation circuit to a controlled element.

7. An automatic control circuit as set forth in claim 6 wherein said pulse width modulation circuit comprises an amplifier and oscillator connected to said amplifier, means connecting said fifth means to said amplifier switch means, means for connecting said switch means between a potential source and a controlled element and means connecting said switch means to said amplifier whereby said switch means is operated in response to the output of said amplifier.

8. In an automatic control circuit, including means for producing a signal representative of a remote condition, the improvement comprising: first means receiving a signal representative of a remote condition for deriving a direct current input signal, the average value of which is representative of the remote condition; second means for comparing said input signal with a reference signal to derive an error signal; third means for deriving a control signal which is proportional to said error signal and to the integral and derivative thereof; fourth means for deriving a feedback signal representative of the position of a controlling element; fifth means for comparing said control signal and said error signal; sixth means responsive to said comparing means to produce an actuating signal to cause a controlled element to assume a desired position; means responsive to the absence of an input signal to reduce said control signal to zero comprising switch means connected to a source of potential and to said means for producing a unipolar signal to maintain said switch means in a nonconducting state when alternating signals are present; and means connecting said switch means between said third means and the ground.

9. In an automatic control circuit, including means for producing a signal representative of a remote condition, the improvement comprising: first means receiving a signal representative of a remote condition for deriving a direct current input signal, the average value of which is representative of the remote condition; second means for comparing said input signal with a reference signal to derive an error signal; third means for deriving a control signal which is proportional to said error signal and to the integral and derivative thereof; fourth means for deriving a feedback signal representative of a position of a controlling element; fifth means for comparing said control signal and said error signal; sixth means responsive to said comparing means to produce an actuating signal to cause a controlled element to assume a desired position; means for limiting said control signal; means responsive to the absence of an input signal to reduce said control signal to zero; means connected to said third means for supplying another control signal; and means for selecting which control signal shall be compared with said feedback signal.

10. In an automatic control circuit, including means for producing a signal representative of a remote condition, the improvement comprising: first means receiving a signal representative of a remote condition for deriving a direct current input signal, the average value of which is representative of the remote condition; second means for comparing said input signal with a reference signal to derive an error signal; third means for deriving a control signal which is proportional to said error signal and to the integral and derivative thereof; fourth means for deriving a feedback signal representative of a position of a controlling element; fifth means for comparing said control signal and said error signal; sixth means reponsive to said comparing means to produce an actuating signal to cause a controlled element to assume a desired position; means responsive to the absence of an input signal to reduce said control signal to zero; and means for limiting said control signal.

* * * * *